United States Patent
Achour et al.

(10) Patent No.: US 6,757,541 B2
(45) Date of Patent: Jun. 29, 2004

(54) SYSTEM AND METHOD FOR SENDING A SUPPLEMENTAL CHANNEL REQUEST MESSAGE IN A WIRELESS COMMUNICATION DEVICE

(75) Inventors: Baaziz Achour, San Diego, CA (US); Arjun Khare, San Diego, CA (US); Ravishanker Mudigonda, San Diego, CA (US); Steven Yoon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 10/226,455

(22) Filed: Aug. 23, 2002

(65) Prior Publication Data

US 2003/0060208 A1 Mar. 27, 2003

Related U.S. Application Data (60) Provisional application No. 60/325,702, filed on Sep. 27, 2001, and provisional application No. 60/383,250, filed on May 23, 2002.

(51) Int. Cl.[7] ................................................. H04Q 7/32
(52) U.S. Cl. .................... 455/450; 455/509; 455/422.1; 455/517; 455/500; 455/403; 370/229; 370/330
(58) Field of Search ................................ 455/450, 451, 455/452, 509, 403, 422.1, 550.1, 517, 500, 512, 434, 426.1; 370/342, 329, 229, 330, 252, 235

(56) References Cited

U.S. PATENT DOCUMENTS

| 6,490,268 B1 | * | 12/2002 | Lee et al. | 370/342 |
| 2002/0154610 A1 | * | 10/2002 | Tiedemann Jr. et al. | 370/329 |
| 2002/0160812 A1 | * | 10/2002 | Moshiri-Trafreshi et al. | 455/452 |

FOREIGN PATENT DOCUMENTS

| WO | 0150637 | 7/2001 | ............ H04B/7/26 |

OTHER PUBLICATIONS

Knisely, et al., "Evolution of Wireless Data Services: IS–95 to cdma2000", IEEE Communications Magazine, vol. 36, No. 10, Oct. 1998, pp. 140–149.

* cited by examiner

*Primary Examiner*—William Trost
*Assistant Examiner*—Keith Ferguson
(74) *Attorney, Agent, or Firm*—Philip Wadsworth; Charles D. Brown; Richard A. Bachand (57) ABSTRACT

A mobile station (16) may include a terminal equipment (10), a mobile station modem (14), a mobile telephone (12), and other features. A CPU (52) selectively generates control signals to efficiently control transmission of supplemental channel request messages (SCRM) by the mobile station (16). In one embodiment, transmission of a SCRM in response to a predetermined event is prohibited until a fixed period of time has elapsed since the last transmission of an SCRM in response to the predetermined event.

31 Claims, 10 Drawing Sheets

SYSTEM AND METHOD FOR SENDING A SUPPLEMENTAL CHANNEL REQUEST MESSAGE IN A WIRELESS COMMUNICATION DEVICE

RELATED APPLICATIONS

This applications claims priority to U.S. Provisional Application No. 60/325,702 filed on Sep. 27, 2001 and U.S. Provisional Application No. 60/383,250 filed on May 23, 2002.

BACKGROUND

1. Technical Field

The technical field generally relates to the field of wireless communications. More particularly, the technical field relates to a system and method for efficient transmission of a supplemental channel request message (SCRM) for a reverse supplemental channel (R-SCH) in a wireless communications device.

2. Description of the Related Art

Recent advances in wireless communications and the rapid expansion of use of the Internet have greatly increased the demand for mobile computing. Technologies for allowing a large number of system users to share a communication system, such as Code Division Multiple Access (CDMA) technology, have played a critical role in meeting that demand.

CDMA is a digital radio-frequency (RF) technique defined in the Telecommunications Industry Association/Electronics Industries Association Interim Standard-95, entitled "MOBILE STATION-BASE STATION COMPATIBILITY STANDARD FOR DUAL-MODE WIDEBAND SPREAD SPECTRUM CELLULAR SYSTEM," which was published in July 1993 and which is incorporated herein by reference.

CDMA communication devices are assigned a unique code, and each device uses its code to spread its communication signals across a common spread-spectrum bandwidth. As long as the communication device has the correct code, it can successfully detect and select its signal from among other signals concurrently transmitted over the same bandwidth.

Other multiple access techniques include time division multiple access (TDMA) and frequency division multiple access (FDMA) systems. There are also analog frequency modulation (FM) based wireless communication systems, such as the Advanced Mobile Phone System (AMPS). In addition, many wireless communication devices combine communications capabilities with global position system (GPS) techniques. Some wireless communication systems are capable of operating using multiple techniques, such as CDMA and GPS, or on different frequency bands, such as cellular or Personal Communication Services (PCS) bands.

The increased reliability of mobile communications has led to a demand for remote wireless computing where a computing device, such as a laptop computer or palmtop computer, is remotely coupled to a computer network (e.g., the Internet) via the mobile telephone.

Figure 1:
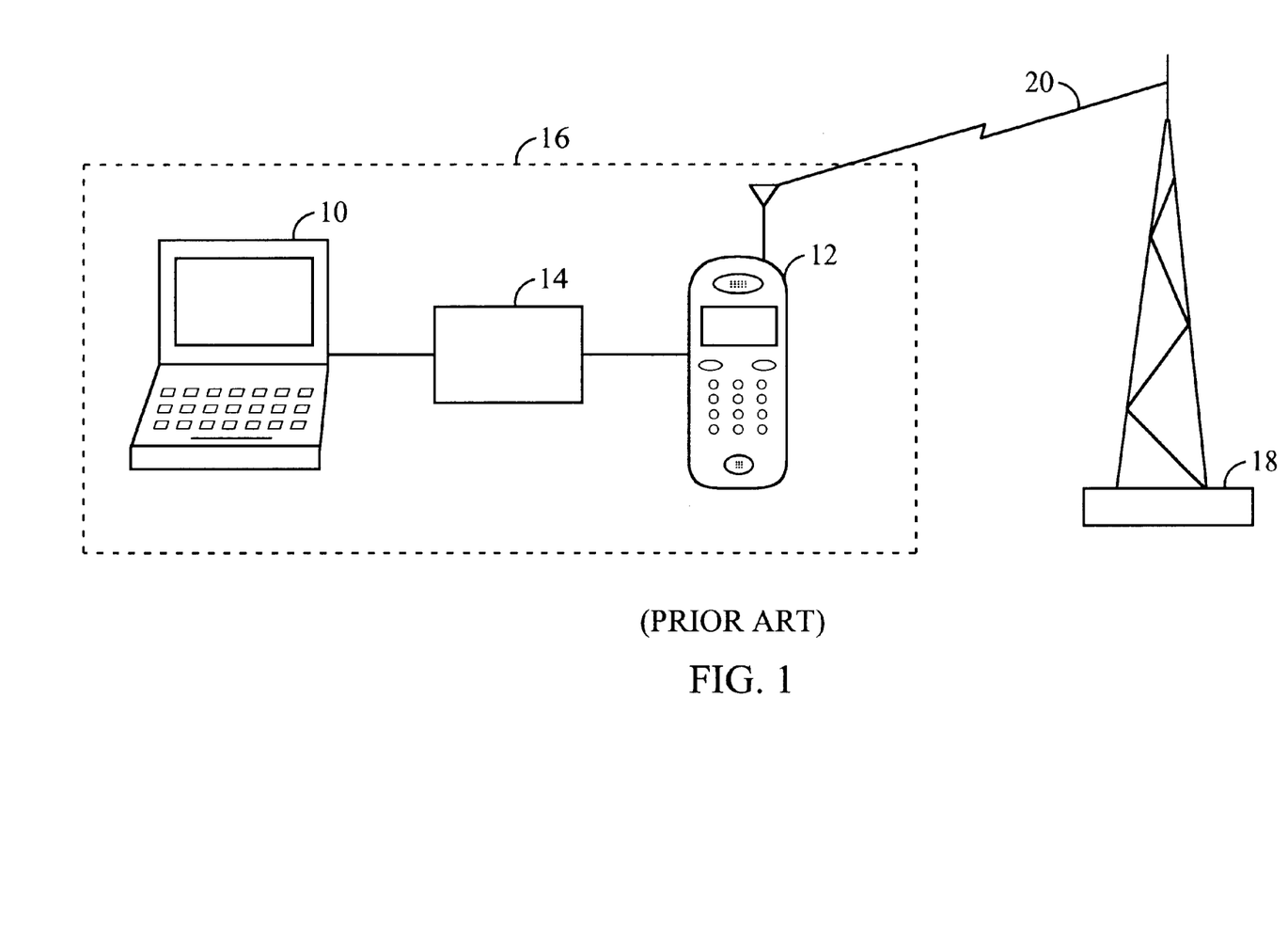
FIG. 1 is a functional block diagram of wireless link of an MS with a BTS.

FIG. 1 is a functional block diagram illustrating a wireless data connection. In FIG. 1 a terminal equipment (TE) 10 may be a laptop, palmtop, or other conventional computing device. The TE 10 is coupled to a wireless communication device, such as a mobile telephone (MT) 12, usually through a mobile system modem (MSM) 14. The MSM 14 may be incorporated into the TE 10 or into the MT 12.

The TE 10, MT 12 and MSM 14 may conveniently be collectively characterized as a mobile station (MS) 16, as indicated by the dashed lines in FIG. 1. In fact, the MS 16 may be an integrated device comprising a TE 10, an MT 12, and an MSM 14.

The wireless communication system of FIG. 1 also includes a base station transceiver system (BTS) 18. The BTS 18 communicates with the MS 16 via a wireless communication link 20.

To establish a communication link between the MS 16 and the BTS 18, communication signals are exchanged. Various protocols and standards provide a framework for implementing a wireless data connection. The actual implementation of hardware and software within that framework is left to the discretion of the designer.

Such implementations may take advantage of the fact that in most communication sessions the MS 16 receives much more data from the BTS 18 (forward channel communication) than the MS 16 transmits to the BTS 18 (reverse channel communication). Thus, less bandwidth may normally be assigned for reverse channel communication, with additional bandwidth assigned as the amount of data to be transmitted increases. In one such implementation the BTS 18 is configured to assign a reverse supplemental channel (R-SCH) with an assigned data rate and burst length to an MS 16 in response to a supplemental channel request message (SCRM) from the MS 16.

Typically, at call setup the MS 16 and the BTS 18 will negotiate a maximum agreed R-SCH data rate. The negotiated rate may be based on various factors, such as the maximum rate the MS 16 can support and the amount of available power resources of the MS 16 to be allocated to reverse channel communication. The MS 16 sends a non-zero length SCRM to the BTS 18 to indicate a R-SCH is needed in response to certain triggering events.

For example, the MS 16 may send an SCRM when it does not have an R-SCH assignment and a certain number of bytes are buffered for transmission to the BTS 18. The MS 16 may also send an SCRM when the assigned R-SCH data rate is too high or too low for the current operating conditions. The MS 16 may also send a zero-length SCRM to cancel a R-SCH.

The MS 16 may request a R-SCH. In response, the BTS 18 may assign a R-SCH and notify the MS 16 of the assignment with an extended supplemental channel assignment message (ESCAM) or a universal handoff direction message (UHDM). Moreover, the BTS 18 may not grant the requested data rate or may not grant the request at all. In addition, there may be a delay in granting the request. The BTS 18 may also send a retry delay message to the MS 16.

One of the problems that has been encountered is "flooding" of the BTS 18 with SCRMs, even though a triggering event may have occurred. Thus, an MS 16 may transmit too many SCRMs, including SCRMs which are not likely to result in a more optimal assignment of R-SCHs by the BTS 18. In addition, when the amount of data to be transmitted exceeds the capacity of a currently assigned R-SCH, there can be a significant delay between the termination of the current R-SCH burst and the start of a subsequent R-SCH.

Therefore, it can be appreciated that there is a significant need for an efficient system and method for controlling transmission of an SCRM for a R-SCH in a wireless communication device.

BRIEF SUMMARY

The system and method described herein are directed to controlling transmission of supplemental channel request messages (SCRM) by a wireless communication device. In one embodiment, the system may be configured to prevent transmission of a SCRM in response to a predetermined triggering event until a fixed period of time has elapsed since the last transmission of a SCRM in response to the predetermined triggering event. In another embodiment, the system may be configured to prohibit transmission of a SCRM when a reverse supplemental channel (R-SCH) burst has been assigned but has not started.

DETAILED DESCRIPTION

The system and method described herein are directed to efficient transmission of SCRMs in a mobile communications device.

As noted above, a number of different standards exist to govern wireless data communication. These standards may be implemented in a number of different ways to provide some flexibility to the designer. FIG. 1 illustrates the simplified general wireless connection that supports the communication process.

Figure 2:
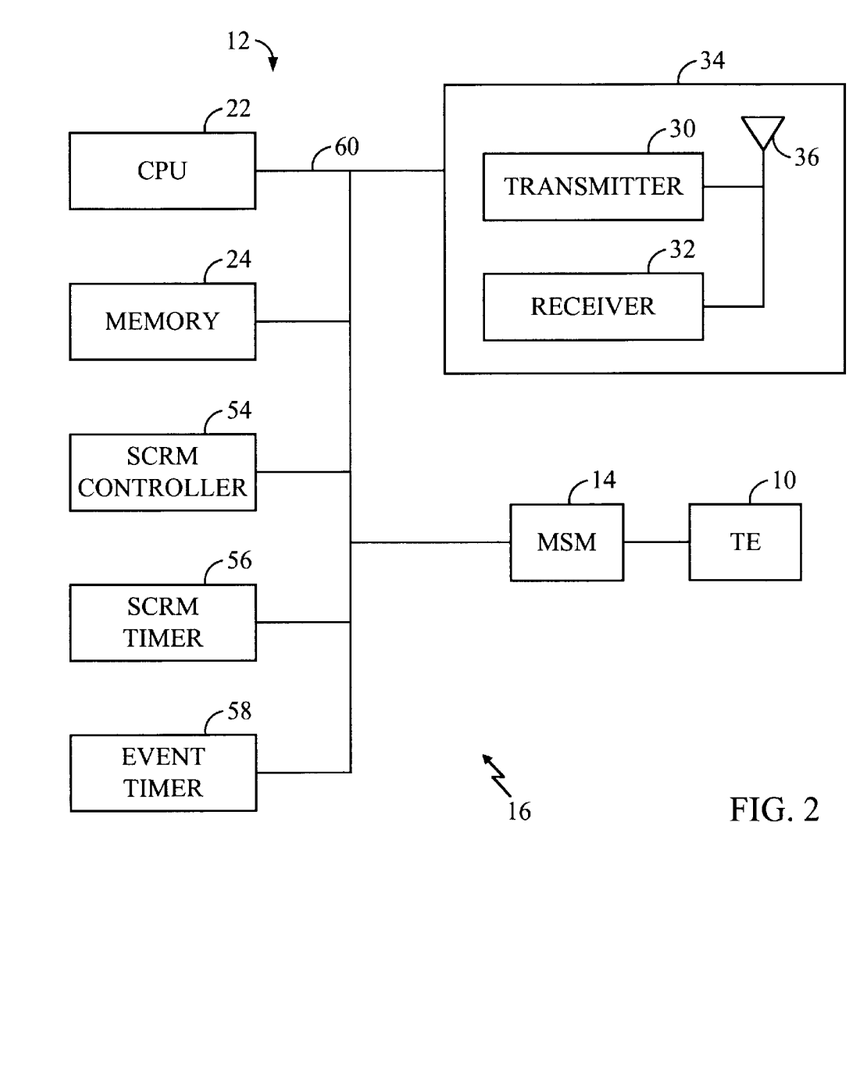
FIG. 2 is a functional block diagram of a MS of an embodiment.

A system is embodied in an MS 16 illustrated in the functional block of FIG. 2. The MS 16 includes a central processing unit (CPU) 22 and a memory 24, which controls operation of the system. Those skilled in the art will appreciate that the term "CPU" is intended to encompass any processing device, alone or in combination with other devices such as a memory, that is capable of operating the MS 16 or a portion thereof. This includes microprocessors, embedded controllers, application specific integrated circuits (ASICs), digital signal processors (DSPs), state machines, dedicated discrete hardware, and the like. The system and method described herein are not limited by the specific hardware component selected to implement the CPU 22. Moreover, after reviewing the specification one of skill in the art will recognize that the CPU 22 may be incorporated into other components of the MS 16, including the MSM 14, the MT 12 or the TE 10.

The memory 24, which may include both read-only memory (ROM) and random-access memories (RAM), provides instructions and data to the CPU 22. A portion of the memory 24 may also include non-volatile random-access memory.

The MS 16 also includes a transmitter 30 and a receiver 32 to allow transmission and reception of data, such as audio communication and programming data, between the MS 16 and a remote location, such as a base transceiver station (BTS) 18 (see FIG. 1). As mentioned above, the transmitter 30 and the receiver 32 may be combined into a transceiver 34. An antenna 36 is electrically coupled to the transceiver 34. The operation of the transmitter 30, receiver 32, and antenna 36 is well-known in the art and need not be described herein.

The MS 16 also includes an SCRM controller 54, which may typically be implemented by the CPU 22, executing instructions stored in the memory 24. The MS 16 may use the SCRM controller 54 to generate control signals to control the transmission of SCRMs by the MS 16.

The MS 16 also includes an SCRM timer 56, and an event timer 58, both of which may typically be implemented by the CPU 52 or the SCRM controller 54. As will be described in detail below, the SCRM controller 54 uses the timers 56, 58 to control SCRM transmissions.

The various components of the MS 16 are coupled together by a bus system 60 which may include a power bus, control bus and status signal bus in addition to a data bus. For the sake of clarity, however, the various buses are illustrated in FIG. 2 as the bus system 60.

Those of skill in the art will recognize that the MS 16 may contain other components, such as a battery (not shown), and input/output devices (not shown), and that the components can be arranged in various configurations. For example, FIG. 2 illustrates the TE 10 coupled to the MT 12 via the MSM 14, as also illustrated in FIG. 1. However, the TE 10 may be coupled directly to the bus system 60 if the TE 10, MT 12 and MSM 14 are integrated into the MS 16. The system and method described herein are not limited to the specific configuration and arrangement of components shown.

The SCRM controller 54 may use the timers 56, 58 to determine when to generate control signals to control the transmission of SCRMs by the MS 16. The SCRM timer 56 may be started or restarted when the MS 16 transmits an SCRM for a non-zero R-SCH. The SCRM timer 56 may be cancelled when a fixed time period has elapsed or when the MS 16 receives either an ESCAM or a UHDM with a non-zero R-SCH assignment. The SCRM controller 54 may be configured to disable the ability of the MS 16 to transmit an SCRM for a non-zero R-SCH when the SCRM timer 56 is running. After reviewing this specification, one of skill in the art will recognize that the time period may be fixed at the factory, may be fixed by the user, may be fixed by the SCRM controller 54 in response to RF conditions, or the amount of traffic on the channel, or may be fixed in response to a signal received by the MS 16.

The event timer 58 may be started or restarted whenever a predetermined event occurs. For example, the predetermined event may be transmission of an SCRM by the MS 16 in response to a particular triggering event. The predetermined event may also be the start of an assigned R-SCH burst. The event timer 58 may also be started or restarted when one of a plurality of predetermined events occurs.

The event timer 58 may be cancelled when a fixed time period has elapsed, when a current R-SCH burst ends, or when an ESCAM to cancel an R-SCH is received and there is no current R-SCH burst active. After reviewing this specification, one of skill in the art will recognize that the time period may be fixed at the factory, may be fixed by the user, may be fixed by the SCRM controller 54 in response to RF conditions or traffic on the channel, or may be fixed in response to a signal received by the MS 16. The fixed time period when the event timer 58 expires need not be the same fixed time period when the SCRM timer 56 expires.

The SCRM controller 54 may be configured to disable the ability of the MS 16 to transmit an SCRM for a non-zero R-SCH in response to a predetermined triggering event when the event timer 58 is running. The SCRM controller 54 may also be configured to disable the ability of the MS 16 to transmit an SCRM for a non-zero R-SCH in response to any one of a plurality of predetermined triggering events when the event timer 58 is running.

In an exemplary embodiment, the SCRM controller 54 may be configured to generate control signals to cause the transmission of a burst extension SCRM for a non-zero R-SCH when the MS 16 determines the current R-SCH burst is not adequate for current data needs, and before the current R-SCH burst ends. For example, the MS 16 may determine that the number of bytes or frames remaining to be transmitted exceeds the number of bytes or frames that can be transmitted in the current R-SCH burst. In response to a burst extension SCRM, the BTS 18 may assign a new R-SCH burst, or may deny the request. Use of burst extension SCRMs helps to reduce the time between expiration of the current R-SCH burst and the start of the next R-SCH burst. In an exemplary embodiment, the newly assigned R-SCH burst will either overlap or be contiguous with the current R-SCH burst. In an exemplary embodiment, the transmission of a burst extension SCRM will not be one of the predetermined events that results in the starting or restarting of the event timer 58.

The SCRM controller 54 may disable the ability of the MS 16 to transmit a burst extension SCRM when the SCRM timer 56 is running. The ability of the MS 16 to transmit a burst extension SCRM may also be further restricted. For example, it may be prohibited until the burst length remaining in the current R-SCH is below a predetermined threshold value, such as a certain number of remaining available frames or until a fixed time period before the end of the current R-SCH burst. The predetermined threshold value may be set at the factory, set by the user, set in response to RF conditions or traffic on the channel, or set in response to a signal received by the MS 16. The period in which a burst extension SCRM may be transmitted to request extension of a current R-SCH burst, assuming other conditions permit transmission of a burst extension SCRM, may be referred to as the burst extension gap. Additional timers may be employed to implement additional restrictions on the ability of the MS 16 to transmit a burst extension SCRM.

In another exemplary embodiment, the SCRM controller 54 may be configured to disable the ability of the MS 16 to transmit an SCRM for a non-zero R-SCH (whether to request a burst extension or in response to another triggering event) during the time period after an ESCAM or UHDM assigning a non-zero R-SCH is received and before the assigned R-SCH burst starts or another message canceling the assigned non-zero R-SCH is received.

The SCRM controller 54 may be readily implemented as a series of instructions stored in the memory 24 and executed by the CPU 22. Thus, minor software modifications to existing hardware will allow the implementation of the MS 16.

For purposes of brevity, the operation of the MS 16 to efficiently transmit SCRMs will be illustrated using a limited number of examples. To simplify the illustrations, events are generally shown as occurring at evenly-spaced time intervals. However, events may occur at different time intervals and in different orders than as illustrated.

Figure 3:
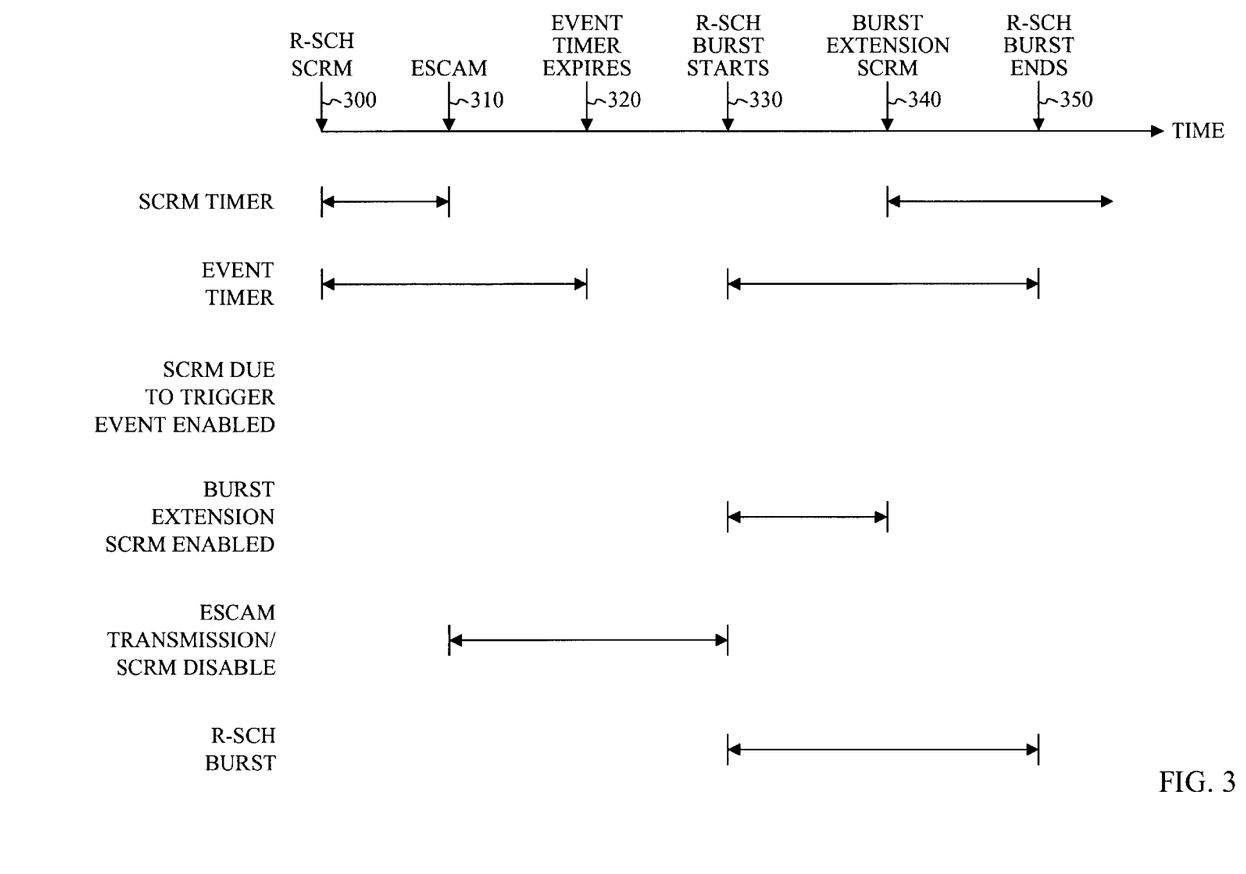
FIG. 3 is a timing diagram illustrating the operation of an embodiment.

FIG. 3 is a timing diagram illustrating the operation of an embodiment of the MS 16. In the embodiment illustrated in FIG. 3, the MS 16 is configured to start or restart the event timer 58 in response to the following predetermined events: the MS 16 transmits a non-zero R-SCH SCRM because there is no current R-SCH burst and the amount of data to be transmitted to the BTS 18 exceeds a threshold value; the MS 16 transmits a non-zero R-SCH SCRM because the data rate of the current R-SCH burst is not optimal; and an R-SCH burst starts. The SCRM controller 54 is configured to disable the ability of the MS 16 to transmit a non-zero R-SCH SCRM in response to the following triggering events when the event timer 58 is running: there is no current R-SCH burst and the amount of data to be transmitted to the BTS 18 exceeds a threshold value; and the data rate of the current R-SCH burst is not optimal.

At time 300, no R-SCH is active and the MS 16 sends a non-zero R-SCH SCRM because the amount of data to be transmitted to the BTS 18 exceeds a threshold value. The SCRM timer 56 is started because a non-zero R-SCH SCRM was transmitted. The event timer 58 is started because one of the predetermined events has occurred—a non-zero R-SCH SCRM was transmitted when no current R-SCH burst was active because the amount of data to be transmitted to the BTS 18 exceeded a threshold value. Between time 300 and 310, the SCRM controller 54 disables the ability of the MS 16 to transmit an SCRM for a non-zero R-SCH because the SCRM timer 56 is running. During this time period, the SCRM controller 54 also disables the ability of the MS 16 to transmit an R-SCH SCRM in response to one of the predetermined triggering events because the event timer 58 is running.

At time 310 the MS 16 receives an ESCAM assigning a non-zero R-SCH burst. In response to receipt of the ESCAM, the SCRM timer 56 is stopped. The event timer 58 continues to run. Between time 310 and 320, the SCRM controller 54 disables the ability of the MS 16 to transmit an SCRM for a non-zero R-SCH in response to one of the predetermined triggering events because the event timer 58 is running. In the exemplary embodiment illustrated in FIG. 3, the SCRM controller 54 disables the ability of the MS 16 to transmit any SCRM for a non-zero R-SCH because an ESCAM has been received assigning a non-zero R-SCH burst and the assigned burst has not yet started. This is illustrated in FIG. 3 as the ESCAM Transmission/SCRM disable.

At time 320, the fixed time period for the event timer 58 to operate expires. The event timer 58 stops. In the exemplary embodiment illustrated in FIG. 3, between time 320 and 330 the SCRM controller 54 disables the ability of the MS 16 to transmit an SCRM for a non-zero R-SCH because a non-zero R-SCH burst has been assigned but has not yet started. As noted above, this is illustrated in FIG. 3 as the ESCAM Transmission/SCRM disable.

At time 330, the assigned R-SCH burst starts. The event timer 58 is started to prevent the MS 16 from instantly transmitting an SCRM because the MS 16 is not satisfied with the assigned data rate. The SCRM timer 56 remains stopped. Between time 330 and 340, the ability of the MS 16 to transmit an SCRM for a non-zero R-SCH in response to one of the predetermined triggering events is disabled because the event timer 58 is running. The ability of the MS 16 to transmit a burst extension SCRM for a non-zero R-SCH is enabled because the SCRM timer 56 is not running and the current R-SCH burst has started. In another embodiment, the ability of the MS 16 to transmit a burst extension SCRM for a non-zero R-SCH may continue to be disabled because other criteria for enablement may not be satisfied. For example, the number of available frames in the current R-SCH burst may exceed a threshold level. In other words, the current R-SCH burst may not be in the burst extension gap.

At time 340, the MS 16 determines that the current R-SCH burst is insufficient to meet the data transmission needs of the MS 16. The SCRM controller 54 generates control signals to cause the MS 16 to transmit a burst extension SCRM for a non-zero R-SCH. In response to the burst extension SCRM, the SCRM timer 56 is started. Between time 340 and 350 the ability of the MS 16 to transmit an SCRM for a non-zero R-SCH is disabled because the SCRM timer 56 is running. The event timer 58 is not restarted, since the SCRM was for a burst extension, and was not due to a triggering event.

At time 350, the current R-SCH burst ends. In response to the end of the current R-SCH burst, the event timer 58 is turned off. As illustrated, the event timer 58 would also be turned off because the fixed time period for the event timer 58 to operate expired. After reviewing the specification, one of skill in the art will recognize that the end of the current R-SCH burst will not necessarily coincide with the expiration of the fixed period of time for the event timer 58 to operate. Between time 340 and 350, the ability of the MS 16 to transmit an SCRM for a non-zero R-SCH for any reason is disabled because the SCRM timer 56 is running.

Figure 4:
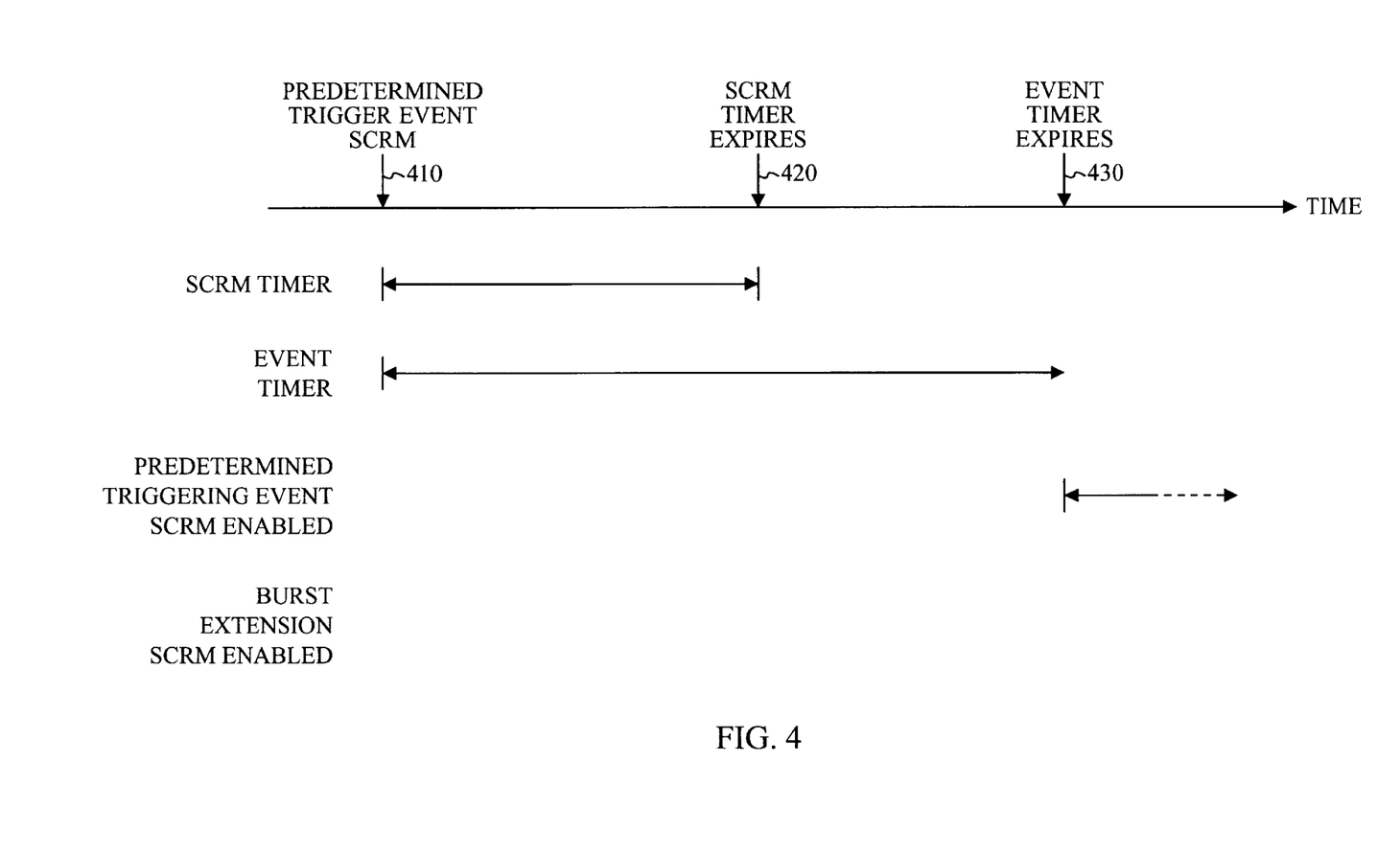
FIG. 4 is a timing diagram illustrating the operation of an embodiment.

FIG. 4 is a timing diagram illustrating the operation of an embodiment when no response is received to a non-zero R-SCH SCRM transmitted in response to one of the predetermined triggering events. At time 410, the MS 16 transmits an SCRM for a non-zero length R-SCH in response to one of the predetermined triggering events. Both timers 56, 58 are started. Between time 410 and 420, the MS 16 cannot transmit an SCRM for a non-zero R-SCH because the SCRM timer 56 is running.

At time 420, the SCRM timer 56 expires. At time 430 the event timer 58 expires. Between time 420 and 430 the MS 16 cannot transmit an SCRM for a non-zero length R-SCH in response to one of the predetermined triggering events because the event timer 58 is running. The MS 16 cannot transmit a burst extension SCRM because there is no current R-SCH burst active. After time 430 the MS 16 can transmit an SCRM for a non-zero R-SCH in response to one of the predetermined events because both timers 56, 58 have expired and no message, such as an ESCAM or UHDM, assigning a non-zero R-SCH burst has been received. The MS 16 cannot transmit a burst extension SCRM because there is no current R-SCH burst active. Thus, FIG. 4 does not show any time period during which the MS 16 can transmit a burst extension SCRM.

Figure 5:
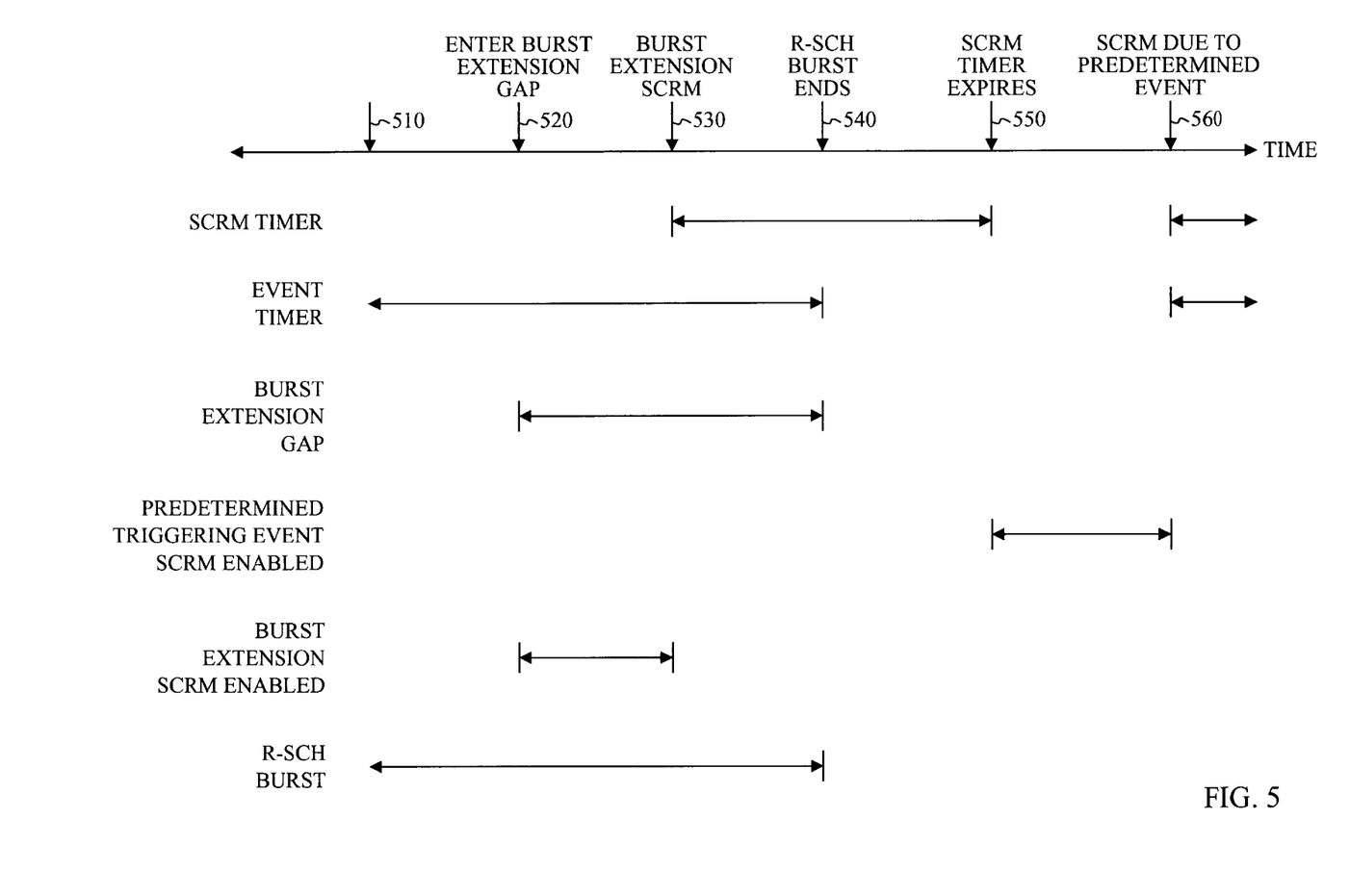
FIG. 5 is a timing diagram illustrating the operation of an embodiment.

FIG. 5 is a timing diagram illustrating the operation of an embodiment when a response to a burst extension SCRM is not received. At time 510 the SCRM timer 56 is off, the event timer 58 is running and a current R-SCH burst is active. Between time 510 and 520, the MS 16 cannot transmit a non-zero SCRM in response to one of the predetermined triggering events because the event timer 58 is running. The MS 16 cannot transmit a burst extension SCRM because the current burst is longer than the burst extension gap, because, for example, the number of frames remaining in the current R-SCH may be above a threshold value.

At 520 the number of available frames in the current R-SCH burst drops below a threshold value and, because the SCRM timer 56 is not running, the ability of the MS 16 to transmit a burst extension SCRM is enabled. The time between time 520 and the end of the current burst at time 540 is the burst extension gap.

At time 530, the MS 16 determines that the current burst length is insufficient and transmits a burst extension SCRM. In response to the burst extension SCRM, the SCRM timer 56 is started. The event timer 58 is not reset because the SCRM was not due to one of the predetermined triggering events. Between time 530 and 540 the MS 16 cannot transmit a non-zero R-SCH SCRM, whether due to one of the predetermined triggering events or to request a burst extension R-SCH, because the SCRM timer 56 is running.

At time 540, the current R-SCH burst ends and, in response, the event timer 58 is stopped. Between time 540 and 550, the MS 16 cannot transmit a non-zero R-SCH SCRM, whether due to a predetermined triggering event or to request a burst extension R-SCH, because the SCRM timer 56 is running. The ability of the MS 16 to transmit a burst extension SCRM is disabled for the additional reason that there is no burst extension gap because there is no current R-SCH burst.

At time 550 the SCRM timer 56 expires and the ability of the system to transmit a non-zero R-SCH SCRM in response to one of the predetermined triggering events is enabled because both timers 56, 58 are stopped and no message assigning a non-zero R-SCH burst has been received. At time 560, the MS 16 transmits an SCRM for a non-zero R-SCH in response to a predetermined triggering event. In response, both timers 56, 58 are started.

Figure 6:
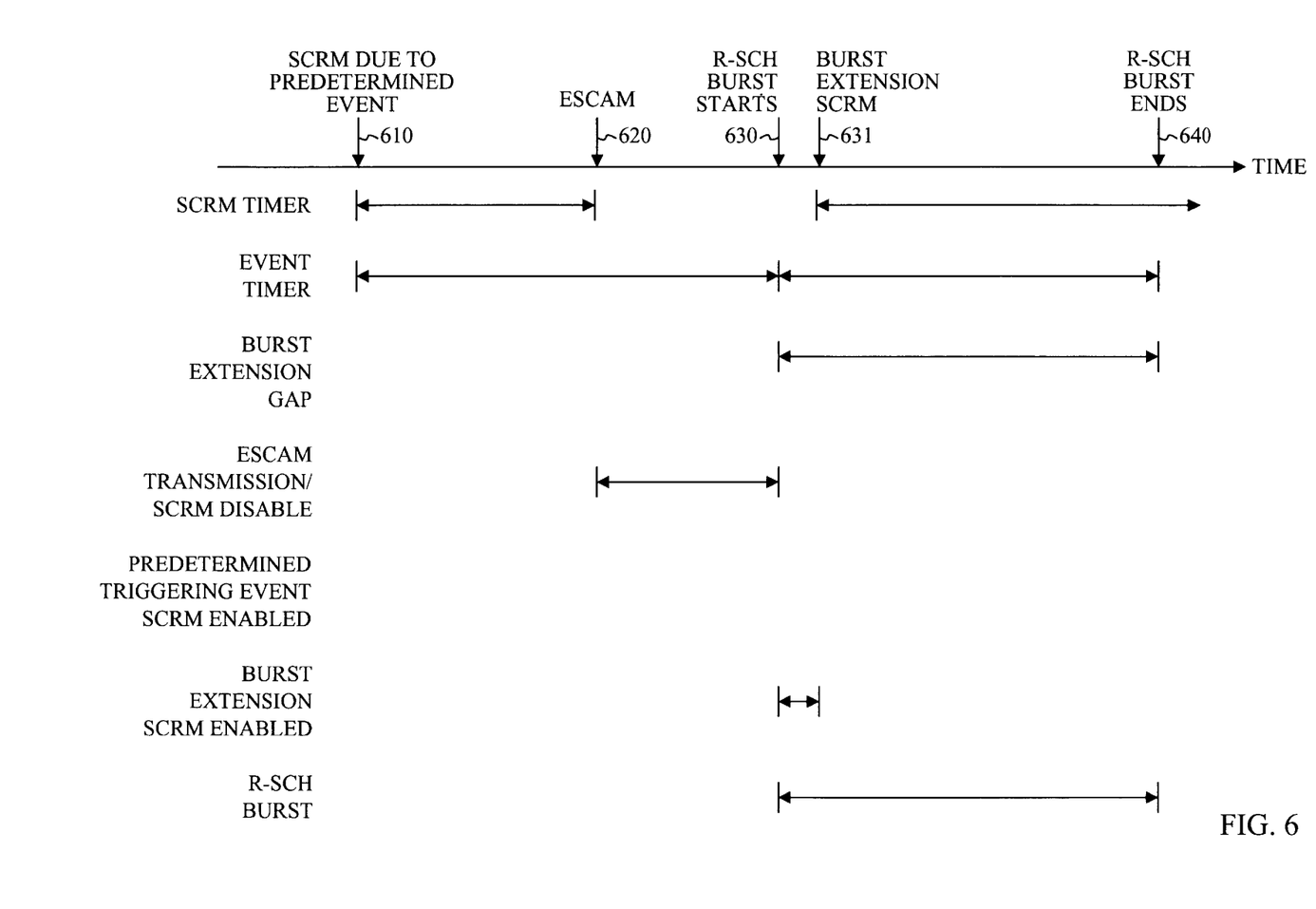
FIG. 6 is a timing diagram illustrating the operation of an embodiment.

FIG. 6 is a timing diagram illustrating the operation of an embodiment when the burst length of an assigned R-SCH is less than the burst extension gap. At time 610 the MS 16 transmits a non-zero R-SCH SCRM in response to one of the predetermined triggering events. In response, both timers 56, 58 are started. Between time 610 and 620 the MS 16 cannot transmit a non-zero R-SCH SCRM.

At time 620 an ESCAM is received assigning a non-zero R-SCH and the SCRM timer 56 is stopped. The burst length of the assigned R-SCH, however, is less than the burst extension gap. The MS 16 cannot transmit a non-zero R-SCH SCRM because a R-SCH burst has been assigned, but has not yet started. The MS 16 cannot transmit a non-zero R-SCH SCRM in response to one of the predetermined triggering events for the additional reason that the event timer 58 is running.

At time 630 the assigned R-SCH burst starts. In response, the event timer 58 is restarted. Assuming the amount of data to be transmitted is sufficient to warrant a burst extension SCRM, the MS 16 will almost instantly transmit a burst extension SCRM because the burst length is less than the burst extension gap and the SCRM timer 56 is not running. This is illustrated in FIG. 6 as occurring at time 631. Transmission of the burst extension SCRM will cause the SCRM timer 56 to start. At time 640 the current burst terminates, which results in the stopping of the event timer 58.

Figure 7:
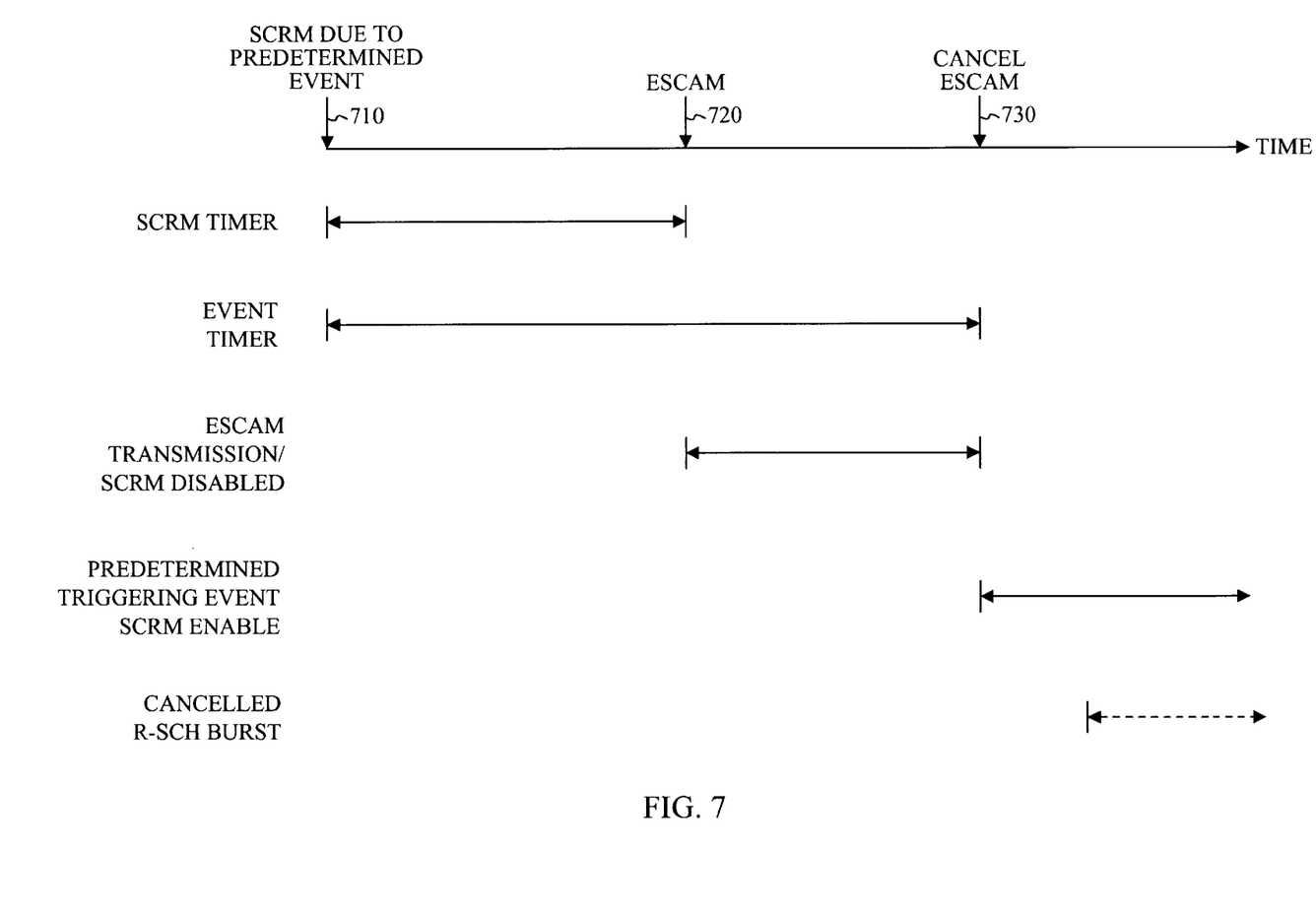
FIG. 7 is a timing diagram illustrating the operation of an embodiment.

FIG. 7 is a timing diagram illustrating the operation of an embodiment when a scheduled R-SCH burst is cancelled. At time 710 a non-zero R-SCH SCRM is transmitted in response to a predetermined triggering event. Both timers 56, 58 are started. At time 720 an ESCAM is received assigning a non-zero R-SCH. In response, the SCRM timer 56 is stopped. The MS 16 cannot transmit a non-zero R-SCH SCRM because a non-zero R-SCH burst has been assigned but has not started. This is illustrated in FIG. 7 as the ESCAM Transmission/SCRM disable. Also, the event timer 58 is running so a non-zero R-SCH SCRM due to one of the predetermined triggering events is not permitted.

At time 730 an ESCAM is received which cancels the scheduled R-SCH burst. In response, the event timer 58 is stopped and the MS 16 is permitted to transmit a non-zero SCRM in response to a predetermined triggering event.

Figure 8:
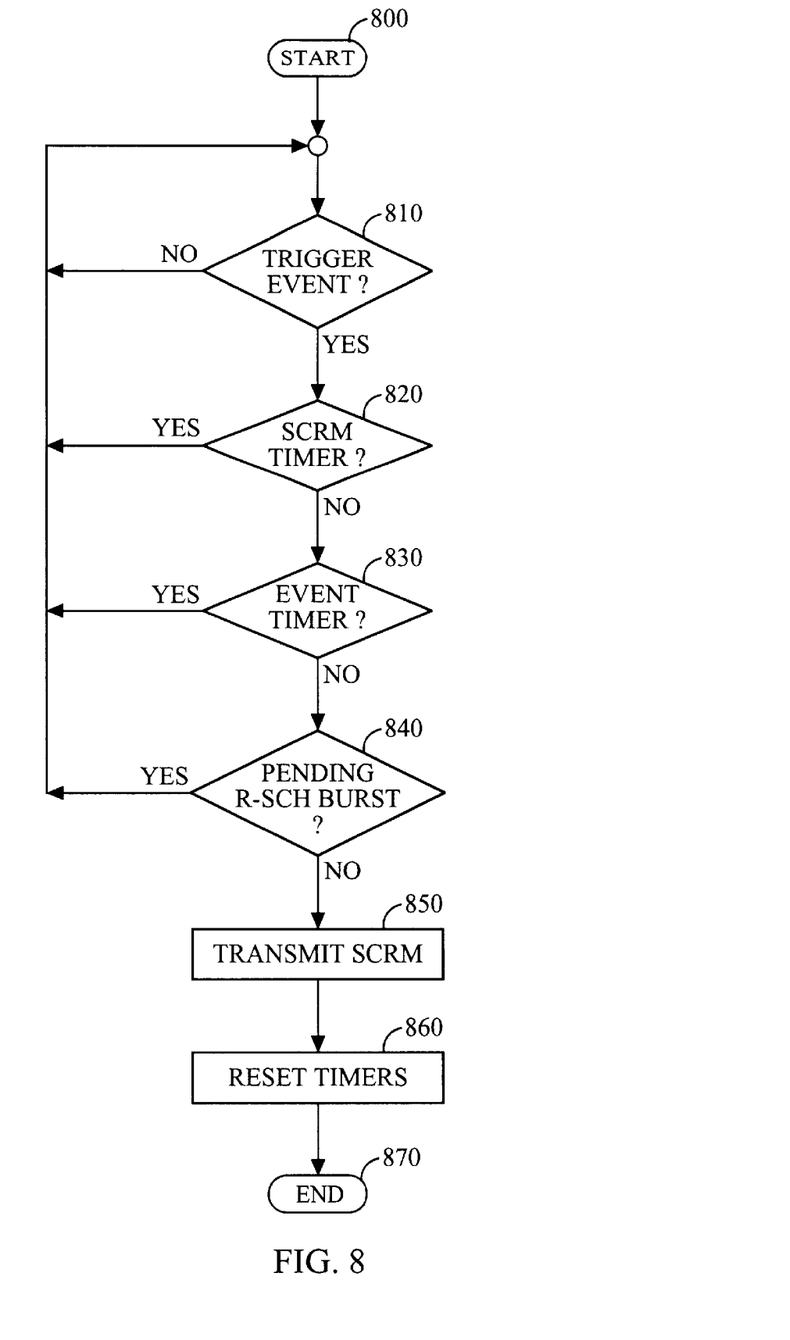
FIG. 8 is a flow chart illustrating the operation of an embodiment.

FIG. 8 is a flow chart illustrating the operation of an embodiment when a predetermined triggering event occurs. At step 800 the MS 16 is started. At step 810 the MS 16 determines whether a non-zero R-SCH SCRM is desired due to a predetermined triggering event. If the answer is YES, the MS 16 proceeds to step 820. If the answer is NO, the MS 16 returns to step 810.

At step 820 the MS 16 determines whether the SCRM timer 56 is running. If the answer is YES, the MS 16 returns to step 810 because a non-zero R-SCH SCRM may not be transmitted while the SCRM timer 56 is running. If the answer is NO, the MS 16 proceeds to step 830.

At step 830 the MS 16 determines whether the event timer is running. If the answer is YES, the MS 16 returns to step 810 because a non-zero R-SCH SCRM in response to a predetermined triggering event may not be transmitted while the event timer 58 is running. If the answer is NO, the MS 16 proceeds to step 840.

At step 840 the MS 16 determines whether a message that a non-zero R-SCH burst is scheduled for the future has been received. If the answer is YES, the MS 16 returns to step 810 because a non-zero R-SCH SCRM may not be transmitted if a non-zero R-SCH burst is scheduled but has not yet started. If the answer is NO, the MS 16 proceeds to step 850.

At step 850, the MS 16 transmits a SCRM requesting a non-zero R-SCH in response to the predetermined triggering event and proceeds to step 860. At step 860, the MS 16 resets the SCRM and event timers 56 and 58 and proceeds to step 870 where processing of the predetermined triggering event by the MS 16 terminates. After reviewing the specification, one of skill in the art will recognize that the steps illustrated in FIG. 8 need not occur in the particular order illustrated and that steps may be omitted and additional steps may be performed in different embodiments.

Figure 9:
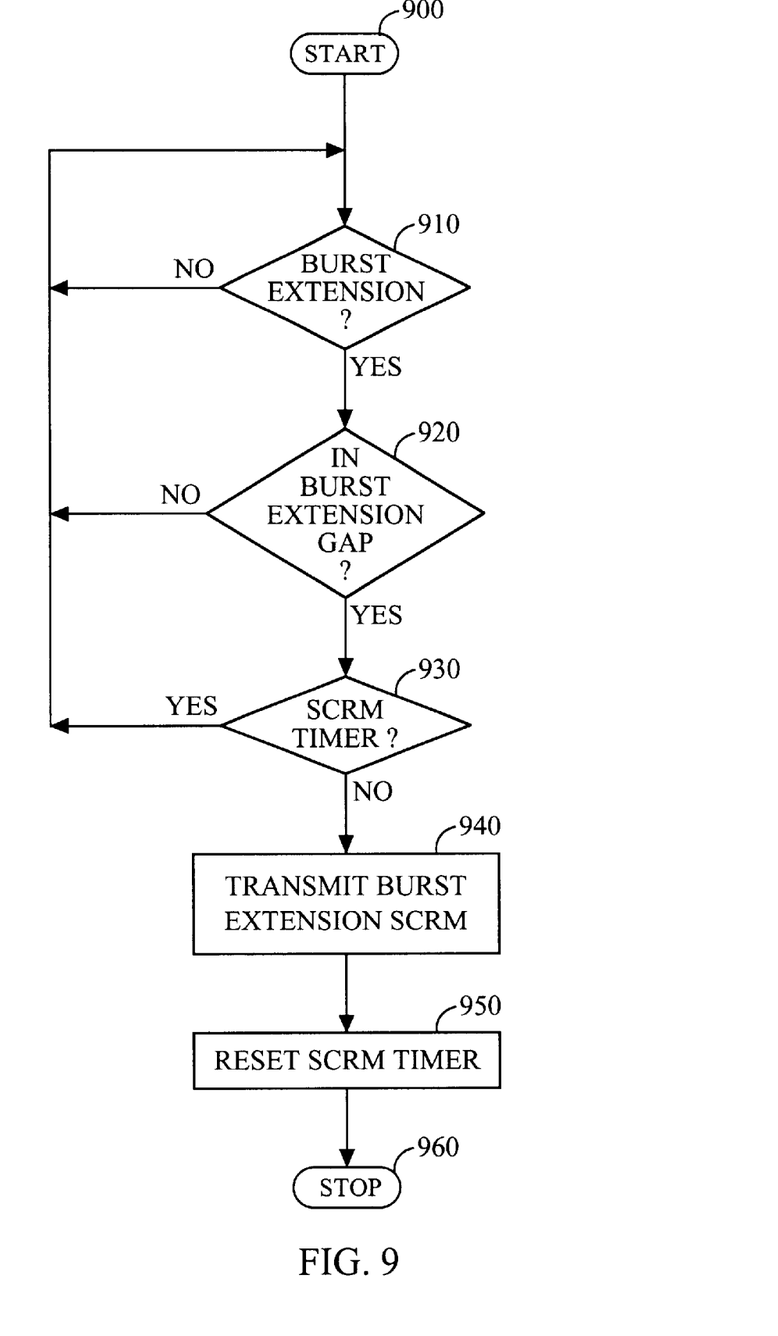
FIG. 9 is a flow chart illustrating the operation of an embodiment.

FIG. 9 is a flow chart illustrating the operation of an embodiment when the MS 16 determines that the current R-SCH burst is insufficient to transmit the current data needs of the MS 16. At step 900 the MS 16 is started. At step 910 the MS 16 determines whether a burst extension is desired. In an exemplary embodiment, the answer to this question will always be NO if there is no current burst. If the answer at step 910 is NO, the MS 16 returns to step 910. If the answer at step 910 is YES, the MS 16 proceeds to step 920.

At step 920, the MS 16 determines whether the current burst is in the burst extension gap. If the answer at step 920 is NO, the MS 16 returns to step 910. If the answer at step 920 is YES, the MS 16 proceeds to step 930.

At step 930, the MS 16 determines whether the SCRM timer 56 is running. If the answer at step 930 is YES, the MS 16 returns to step 910. If the answer at step 930 is NO, the MS 16 proceeds to step 940.

At step 940 the MS 16 transmits a non-zero burst extension SCRM and proceeds to step 950. At step 950 the MS 16 starts or restarts the SCRM timer 56 and proceeds to step 960, where processing of the burst extension request by the MS 16 terminates.

After reviewing the specification, one of skill in the art will recognize that the steps illustrated in FIG. 9 need not occur in the particular order illustrated and that steps may be omitted and additional steps may be performed in different embodiments.

Figure 10:
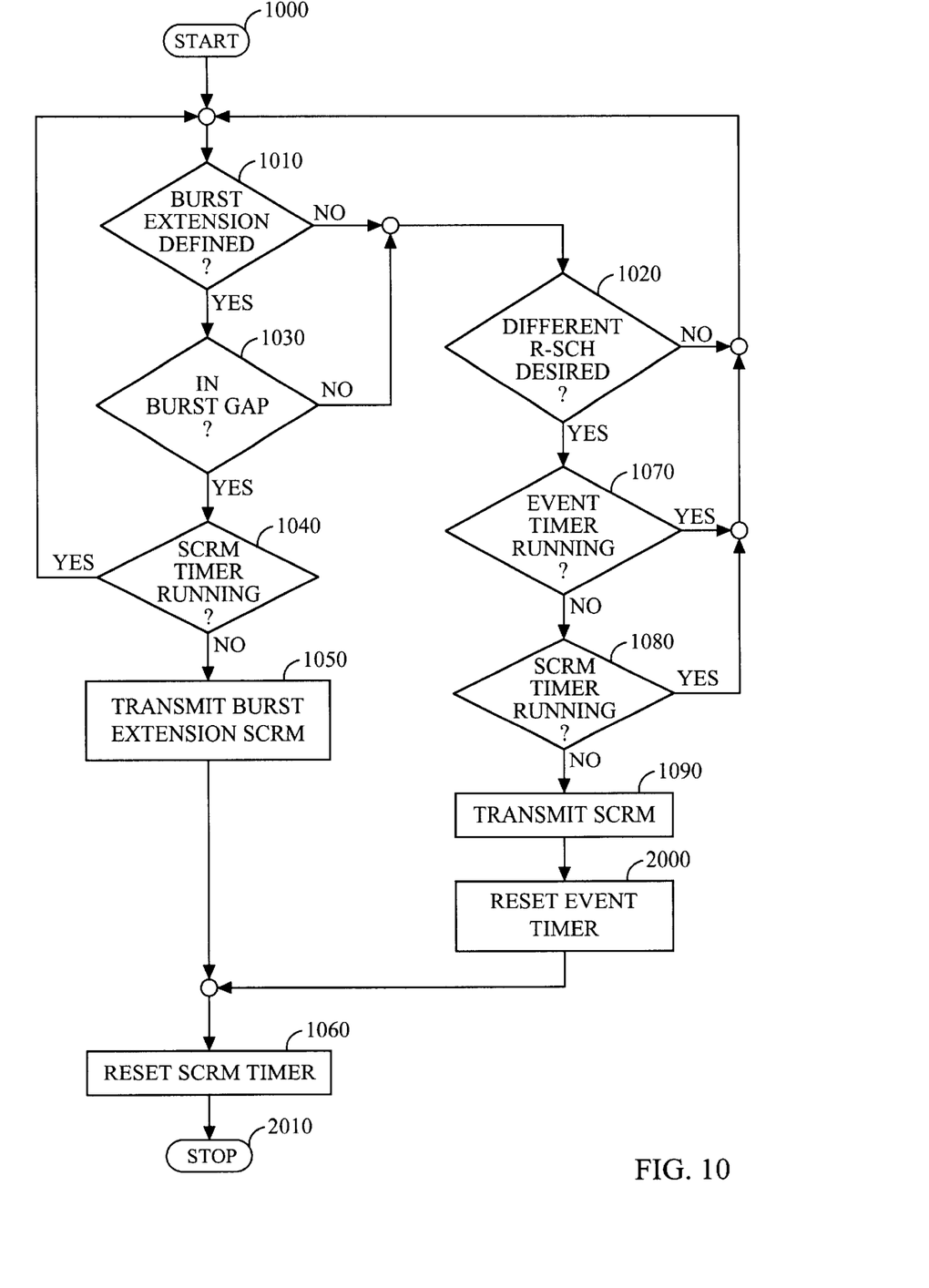
FIG. 10 is a flow chart illustrating the operation of an embodiment.

FIG. 10 is a flow chart illustrating the operation of another embodiment when the MS 16 determines that a current R-SCH burst is not optimal. At step 1000, the MS 16 is started. At step 1010 the MS 16 determines whether a burst extension is desired. In an exemplary embodiment, the answer to this question will always be NO if there is no current R-SCH burst. If the answer at step 1010 is NO, the MS 16 proceeds to step 1020. If the answer at step 1010 is YES, the MS 16 proceeds to step 1030.

At step 1020, the MS 16 determines whether a different R-SCH burst is desired. If the answer at step 1020 is NO, the MS 16 returns to step 1010. If the answer at step 1020 is YES, the MS 16 proceeds to step 1070.

At step 1030, the MS 16 determines whether a current burst is in the burst extension gap. If the answer at step 1030 is YES, the MS 16 proceeds to step 1040. If the answer at step 1030 is NO, the MS 16 proceeds to step 1020.

At step 1040, the MS 16 determines whether the SCRM timer 56 is running. If the answer at step 1040 is YES, the MS 16 returns to step 1010. If the answer at step 1040 is NO, the MS 16 proceeds to step 1050.

At step 1050, the MS 16 transmits a non-zero burst extension SCRM and proceeds to step 1060. At step 1060, the MS 16 starts or restarts the SCRM timer 56 and proceeds to step 2010, where processing terminates.

At step 1070, the MS 16 determines whether the event timer 58 is running. If the answer at step 1070 is YES, the MS 16 returns to step 1010. If the answer at step 1070 is NO, the MS 16 proceeds to step 1080.

At step 1080, the MS 16 determines whether the SCRM timer 56 is running. If the answer at step 1080 is YES, the MS 16 returns to step 1010. If the answer at step 1080 is NO, the MS 16 proceeds to step 1090.

At step 1090, the MS 16 transmits a non-zero R-SCH SCRM and proceeds to step 2000. At step 2000, the MS 16 starts or restarts the event timer 58 and proceeds to step 1060. As noted above, at step 1060, the MS 16 starts or restarts the SCRM timer 56 and proceeds to step 2010, where processing terminates.

After reviewing the specification, one of skill in the art will recognize that the steps illustrated in FIG. 10 need not occur in the particular order illustrated and that steps may be omitted and additional steps may be performed in different embodiments.

It is to be understood that even though various embodiments and advantages have been set forth in the foregoing description, the above disclosure is illustrative only, and changes may be made in detail, yet remain within the broad principles of the disclosure. Therefore, the present invention is to be limited only by the appended claims.

What is claimed is:

1. A system for controlling transmission of a non-zero supplemental channel request message (SCRM) in a wireless radio frequency (RF) communication device, the system comprising:
   an SCRM controller to control transmission of non-zero reverse supplemental channel (R-SCH) SCRMs by the system; and
   an event timer, wherein the SCRM controller is configured to start the event timer when a non-zero R-SCH burst starts and to prohibit the transmission of a non-zero R-SCH SCRM in response to a predetermined triggering event when the event timer is running.

2. The system of claim 1 wherein the SCRM controller is further configured to start the event timer when a non-zero R-SCH SCRM is transmitted in response to the predetermined triggering event.

3. The system of claim 1 wherein the SCRM controller is further configured to stop the event timer when a first predetermined period of time has elapsed since the event timer was last started.

4. The system of claim 1 wherein the SCRM controller is further configured to stop the event timer when a current R-SCH burst ends.

5. The system of claim 1 wherein the SCRM controller is further configured to stop the event timer when a message to cancel a scheduled R-SCH burst is received and there is no current R-SCH burst.

6. The system of claim 1 further comprising an SCRM timer, wherein the SCRM controller is configured to start the SCRM timer when a non-zero R-SCH SCRM is transmitted and to prohibit the transmission of a non-zero R-SCH SCRM when the SCRM timer is running.

7. The system of claim 6 wherein the SCRM controller is further configured to stop the SCRM timer when a predetermined period of time has elapsed since the SCRM timer was last started.

8. The system of claim 6 wherein the SCRM controller is further configured to stop the SCRM timer when a message is received assigning a non-zero R-SCH burst.

9. The system of claim 1 wherein the SCRM controller is further configured to prohibit transmission of a non-zero R-SCH SCRM when a message assigning a non-zero R-SCH burst has been received but the assigned non-zero R-SCH burst has not started or been cancelled.

10. The system of claim 1 wherein the device transmits a burst extension SCRM.

11. The system of claim 1 wherein the SCRM controller is further configured to prohibit the transmission of a burst extension SCRM unless a burst extension gap exists.

12. A method for controlling transmission of a supplemental channel request message (SCRM) in a wireless communication device, the method comprising:
    starting an event timer in response to a start of a reverse supplemental channel (R-SCH) burst; and
    prohibiting transmission of a non-zero R-SCH SCRM triggered by a predetermined event when the event timer is running.

13. The method of claim 12 further comprising starting the event timer in response to the transmission of a non-zero R-SCH SCRM triggered by the predetermined event.

14. The method of claim 12 further comprising stopping the event timer when a current non-zero R-SCH burst ends.

15. The method of claim 12 further comprising stopping the event timer when a message to cancel a future non-zero R-SCH burst is received and there is no current non-zero R-SCH burst.

16. The method of claim 12 further comprising stopping the event timer when a predetermined period of time has elapsed since the event timer was last started.

17. The method of claim 12 further comprising:
    starting an SCRM timer in response to a transmission of a non-zero R-SCH SCRM; and
    prohibiting transmission of a non-zero R-SCH SCRM when the SCRM timer is running.

18. The method of claim 17 further comprising stopping the SCRM timer when a message is received assigning a non-zero R-SCH burst.

19. The method of claim 17 further comprising stopping the SCRM timer when a predetermined period of time has elapsed since the SCRM timer was last started.

20. The method of claim 12 further comprising prohibiting transmission of a non-zero R-SCH SCRM when a message has been received assigning a non-zero R-SCH burst but the assigned burst has not started or been cancelled.

21. The method of claim 12 further comprising transmitting a burst extension SCRM.

22. The method of claim 12 further comprising prohibiting transmission of a burst extension SCRM unless a burst extension gap exists.

23. The method of claim 12 wherein the predetermined event is an accumulation of a threshold amount of data to be transmitted by the wireless communication device.

24. The method of claim 12 wherein the predetermined event is a request for a different R-SCH data transmission rate.

25. A system for controlling transmission of a non-zero supplemental channel request message (SCRM) by a wireless communication device, the system comprising:

a means for transmitting a non-zero SCRM; and a means for selectively enabling transmission of a non-zero reverse supplemental channel (R-SCH) SCRM, wherein transmission of a non-zero R-SCH SCRM is selectively enabled based in part on a predetermined characteristic of a reverse supplemental channel (R-SCH) burst.

26. The system of claim 25 wherein the predetermined characteristic is a start of an R-SCH burst.

27. The system of claim 25 wherein the means for selectively enabling comprises a clock.

28. The system of claim 25 wherein transmission of a non-zero R-SCH SCRM is selective enabled based in part on a predetermined triggering event for the non-zero R-SCH SCRM.

29. The system of claim 25 wherein transmission of a non-zero R-SCH SCRM is selective enabled based in part on a passage of time since a previous R-SCH SCRM was transmitted.

30. The system of claim 25 wherein transmission of a non-zero R-SCH SCRM is selective enabled based in part on a received message.

31. The system of claim 30 wherein the received message assigned a R-SCH burst to the wireless communication device.

* * * * *